United States Patent
Kato

(10) Patent No.: US 9,638,585 B2
(45) Date of Patent: May 2, 2017

(54) SENSOR, METHOD OF MANUFACTURING THE SENSOR, AND IMAGE FORMING APPARATUS INCLUDING THE SENSOR

(71) Applicant: Hidenori Kato, Kobe (JP)

(72) Inventor: Hidenori Kato, Kobe (JP)

(73) Assignee: RICOH COMPANY, LTD., Tokyo (JP)

(*) Notice: Subject to any disclaimer, the term of this patent is extended or adjusted under 35 U.S.C. 154(b) by 449 days.

(21) Appl. No.: 14/203,620

(22) Filed: Mar. 11, 2014

(65) Prior Publication Data
US 2014/0269836 A1    Sep. 18, 2014

(30) Foreign Application Priority Data
Mar. 12, 2013    (JP) .................. 2013-048788

(51) Int. Cl.
*G01K 7/04*    (2006.01)
*G01K 7/02*    (2006.01)
*G01K 13/00*    (2006.01)

(52) U.S. Cl.
CPC ............ *G01K 7/02* (2013.01); *G01K 13/00* (2013.01)

(58) Field of Classification Search
USPC .......................................... 374/208, E11.011
See application file for complete search history.

(56) References Cited

U.S. PATENT DOCUMENTS 6,034,374 A    3/2000 Kimura et al.
7,441,950 B2*  10/2008 Kamiyama .......... G01K 7/42
                                                    338/28
2002/0069910 A1  6/2002 Morita et al.
2005/0224707 A1* 10/2005 Guedj .............. H01L 27/14643
                                                    250/239
2005/0230833 A1  10/2005 Kato et al.
2006/0065949 A1   3/2006 Kato et al.
2007/0075825 A1   4/2007 Kato
(Continued)

FOREIGN PATENT DOCUMENTS

JP    06-117919    4/1994
JP    10-185681    7/1998
JP    2002-176204  6/2002
(Continued)

OTHER PUBLICATIONS

English Traslation, JP2013187512.*
Office Action mailed Jan. 4, 2017 in Japanese Patent Application No. 2013-048788.

*Primary Examiner* — Lisa Caputo
*Assistant Examiner* — Nasir U Ahmed
(74) *Attorney, Agent, or Firm* — Oblon, McClelland, Maier & Neustadt, L.L.P.

(57) ABSTRACT

A sensor is disclosed. The sensor includes a substrate including a cold junction area and a hot junction area and a thermocouple including a pair of thermoelectric elements which is formed to extend linearly between the cold junction area and the hot junction area, and stacked on an upper surface of the substrate. Wherein, a stepwise portion is formed adjacent to an end portion of the thermocouple by removing a portion adjacent to an end portion of one of the pair of thermoelectric elements, and a wiring part of metal is formed in the stepwise portion so as to connect electrically the pair of thermoelectric elements each other.

7 Claims, 14 Drawing Sheets

(56) References Cited

U.S. PATENT DOCUMENTS

2009/0314941 A1 12/2009 Inomata
2010/0102366 A1* 4/2010 Lee .................. H01L 27/14609
257/291

FOREIGN PATENT DOCUMENTS

| JP | 2005-221238 | 8/2005 |
|----|-------------|--------|
| JP | 2009-222489 | 10/2009 |
| JP | 2010-002332 | 1/2010 |
| JP | 2010-243365 | 10/2010 |
| JP | 2013-187512 | 9/2013 |

* cited by examiner

SENSOR, METHOD OF MANUFACTURING THE SENSOR, AND IMAGE FORMING APPARATUS INCLUDING THE SENSOR

CROSS-REFERENCE TO RELATED APPLICATION

The present application is based on and claims priority from Japanese Patent Application No. 2013-048788, filed on Mar. 12, 2013, the disclosure of which is hereby incorporated by reference herein in its entirety.

BACKGROUND

Field of the Invention

The present invention relates to a sensor, a method of manufacturing the sensor, and an image forming apparatus including the sensor.

Conventionally, a sensor including a thermocouple which is configured by a pair of thermoelectric elements stacked on an upper surface of a substrate is known (for example, refer to JP2002-176204A).

In JP2002-176204A, an infrared sensing device (sensor) including a thermocouple which is formed so as to extend linearly on an upper surface of a substrate is disclosed. In the infrared sensing device, the thermocouple is configured from a p-type polysilicon and an n-type polysilicon which are vertically stacked as a pair of thermoelectric elements. In the infrared sensing device, in order to electrically connect the vertically-stacked p-type polysilicon and n-type polysilicon via wiring line, the corresponding end portions of the linearly extended p-type polysilicon and n-type polysilicon are formed bigger (thicker) than the other portions. In addition, a hole is formed in the thick part for disposing the wiring line.

However, in the constitution disclosed in JP2002-176204A, because the corresponding end portions of the linearly extended p-type polysilicon and n-type polysilicon are formed bigger (thicker) than the other portions, a large space is required for disposing a plurality of thick parts when a plurality of thermocouples is disposed on the upper surface of the substrate. Therefore, it is difficult to achieve minimization of the element. In addition, another problem is such that each of the thermocouples includes the thick part, so a distance between each thermocouple becomes longer, and it is difficult to dispose many thermocouples on the upper surface of the substrate, and to keep high-sensibility in the element.

SUMMARY

It is, therefore, the present invention is made to overcome the above-described problems and an object of the present invention is to provide a sensor in which the minimization and high sensitivity of the element are achieved.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENT

Hereinafter, an embodiment of the present invention will be described with reference to the drawings.

First, a constitution of a sensor 100 according to the embodiment of the present invention is described with reference to FIGS. 1 to 3. The sensor 100 is a so-called thermopile element which is used in a temperature sensor, infrared sensor, and the like in an image-forming apparatus.

Figure 1:
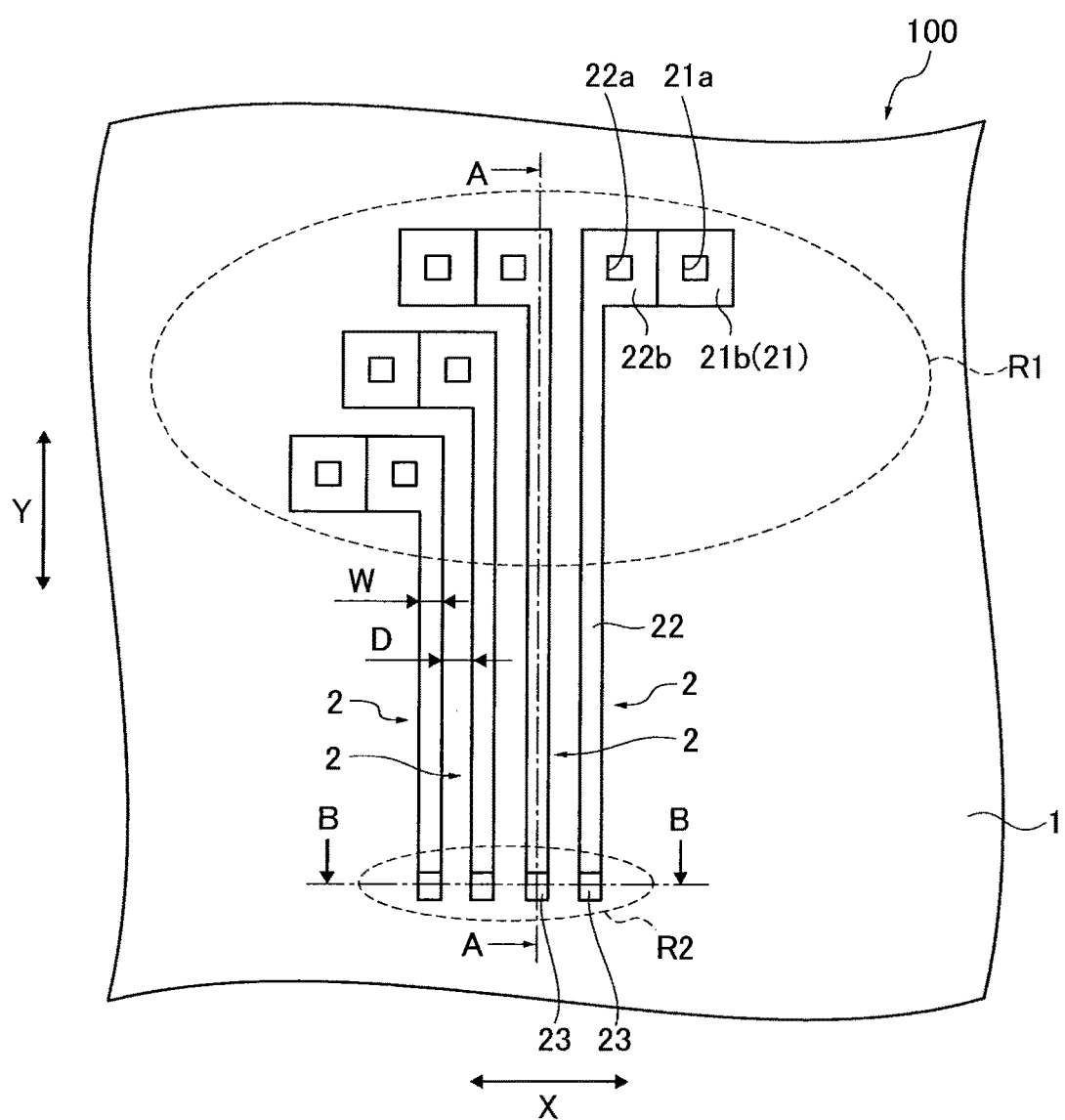
FIG. 1 is a plan view illustrating a constitution of a main section of a sensor according to an embodiment of the present invention.
Figure 2:
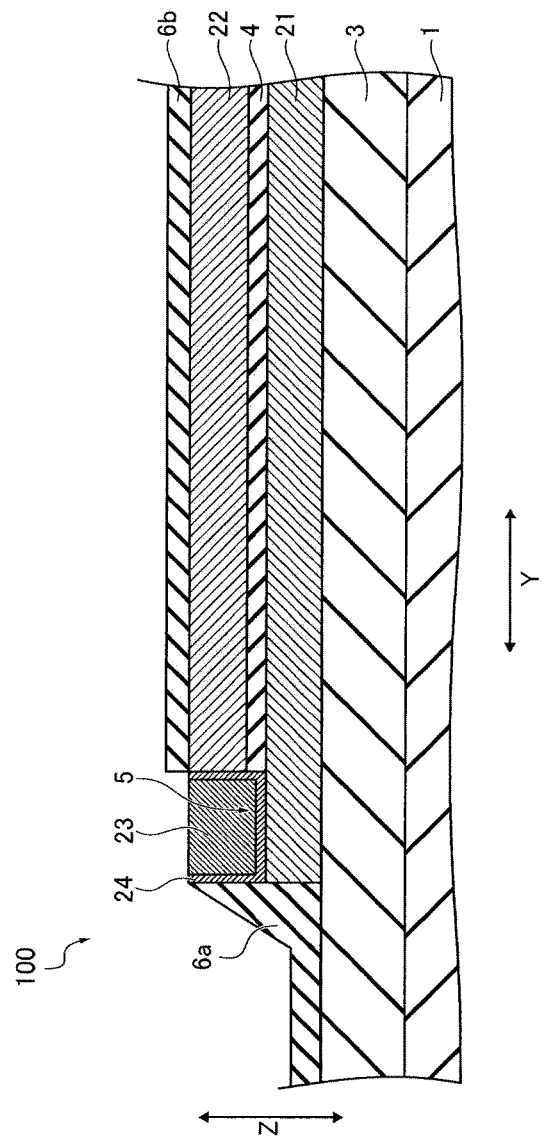
FIG. 2 is a cross-sectional diagram of the sensor shown in FIG. 1 along with an A-A line.
Figure 3:
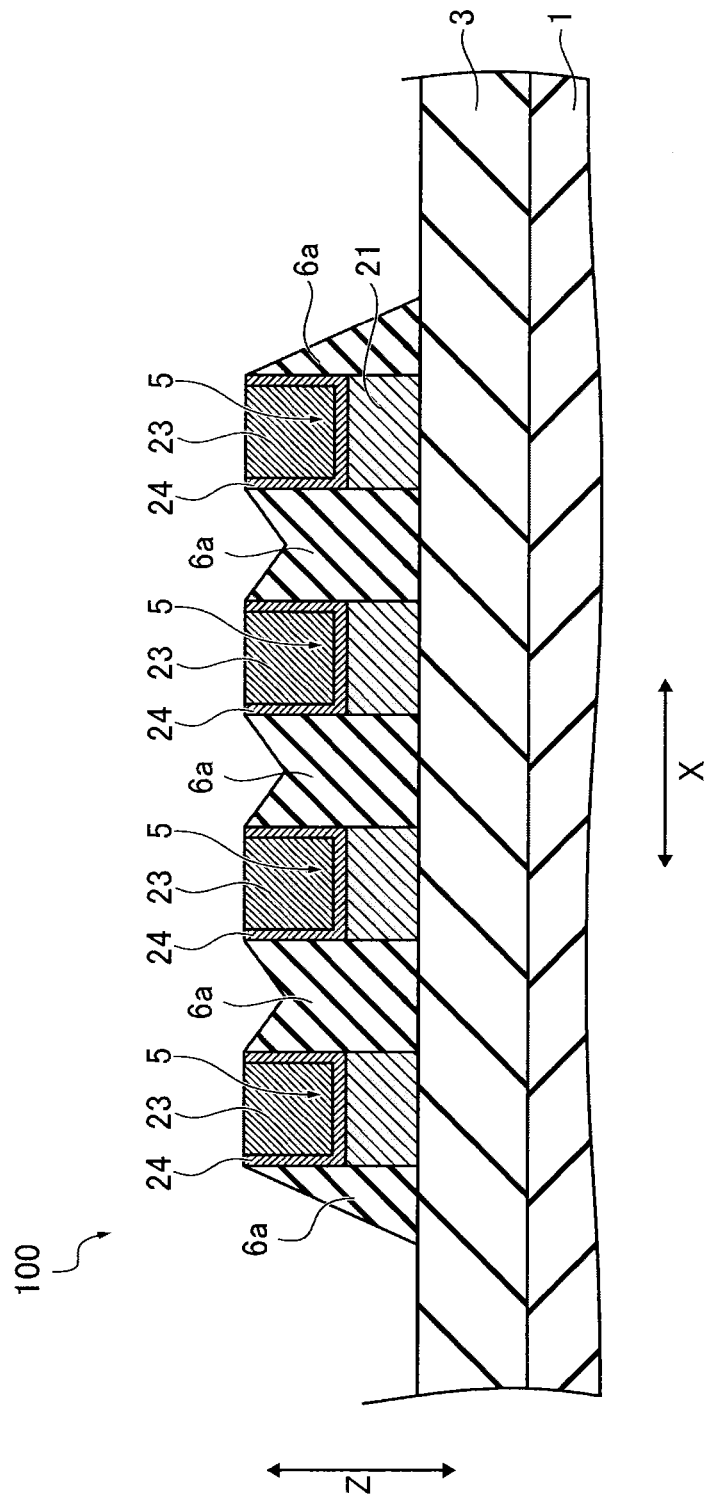
FIG. 3 is a cross-sectional diagram of the sensor shown in FIG. 2 along with a B-B line.

As shown in FIGS. 1 to 3, the sensor 100 includes a silicon substrate 1 and a plurality of (four in FIG. 1) thermocouples 2 formed on the upper surface of the silicon substrate 1. Herein, the silicon substrate 1 is an example of a substrate. As shown in FIG. 1, the silicon substrate 1 includes a cold junction area R1 and a hot junction area R2 on the upper surface thereof. Each of the thermocouples 2 is formed so as to extend linearly between the cold junction area R1 and the hot junction area R2.

In this case, as shown in FIGS. 2 and 3, each of the thermocouples 2 is composed of a pair of thermoelectric elements (N-type polysilicon film 21 and P-type polysilicon film 22) which is stacked on the upper surface of the silicon substrate 1. In detail, a silicon dioxide film 3 is formed on the upper surface of the silicon substrate 1. The N-type polysilicon film 21 is formed on the upper surface of the silicon dioxide film 3. A silicon dioxide film 4 is formed on the upper surface of the N-type polysilicon film 21. The P-type polysilicon film 22 is formed on the upper surface of the silicon dioxide film 4. In this regard, the upper surface of the P-type polysilicon film 22 is coated with a silicon dioxide film 6b which is formed integrally with a side wall section 6a to be described later.

In addition, as shown in FIG. 1, connecting parts 21b and 22b including connecting holes 21a and 22a are formed in each end portion of the N-type polysilicon film 21 and the P-type polysilicon film 22 on the cold junction area R1 side. These connecting parts 21b and 22b have a square shape. A length of one side of the square is longer than the width W of the thermocouple 2 in an X direction. The connecting part 21b is formed so as to protrude from the connecting part 22b on the upper surface of the silicon substrate 1. Thus, the connecting parts 21b and 22b are disposed adjacently each other on the upper surface of the silicon substrate 1. The connecting parts 21b and 22b are electrically connected each other through a metal line (not shown) installed in the connecting holes 21a and 22a.

Herein, in the present embodiment, as shown in FIG. 2, a stepwise portion 5 is formed in the end portion of the thermocouple 2 on the hot junction area R2 by removing the end portion of the P-type polysilicon film 22 and the silicon dioxide film 4 on the hot junction area R2 side. In the stepwise portion 5, an embedded metal 23 (described later in detail) is formed in order to connect electrically the end portions of the N-type polysilicon film 21 and P-type polysilicon film 22 on the hot junction area R2 each other. The embedded metal 23 is an example of a wiring part.

In addition, in the present embodiment, as shown in FIGS. 2 and 3, the side wall section 6a which is composed of the silicon dioxide film is formed around a plurality of thermocouples 2. The side wall section 6a is filled between the thermocouples 2 and formed so as to cover the entire side surfaces of the thermocouples 2. Thereby, an area formed by the stepwise portion 5 and the side wall section 6a (a cuboid space formed by the end surface of the P-type polysilicon film 22 on the side of the hot junction area R2, the upper surface of the portion where the N-type polysilicon film 21 protrudes from the P-type polysilicon film 22, and the internal surface of the side wall section 6a) is formed in the end portion of the thermocouples 2 on the hot junction area R2. The end portion of the N-type polysilicon film 21 on the hot junction area R2 and the end portion of the P-type polysilicon film 22 on the hot junction area R2 are electrically connected through an adhesion layer 24 and the embedded metal 23 by filling the cuboid-shape space with the embedded metal 23 through the adhesion layer 24. The adhesion layer 24 is composed of a material including titanium as a primary component. The embedded metal 23 is composed of a material including tungsten as a primary component.

In the present embodiment, as shown in FIG. 1, a plurality of thermocouples 2 is disposed on the upper surface of the silicon substrate 1 at nearly equal intervals in the X direction. In addition, the thermocouples 2 are disposed adjacent to each other. In this case, a length of a disposing interval D of the thermocouples 2 in the X direction is nearly equal to a width W of the thermocouples 2 in the X direction. Herein, the silicon dioxide film 3, the side wall section 6a, the silicon dioxide film 6b, and the adhesion layer 24 shown in FIGS. 2 and 3 are omitted in FIG. 1 for the simple representation.

Next, the manufacturing method of the sensor 100 according to the present embodiment is described with reference to FIGS. 4 to 13.

Figure 4:
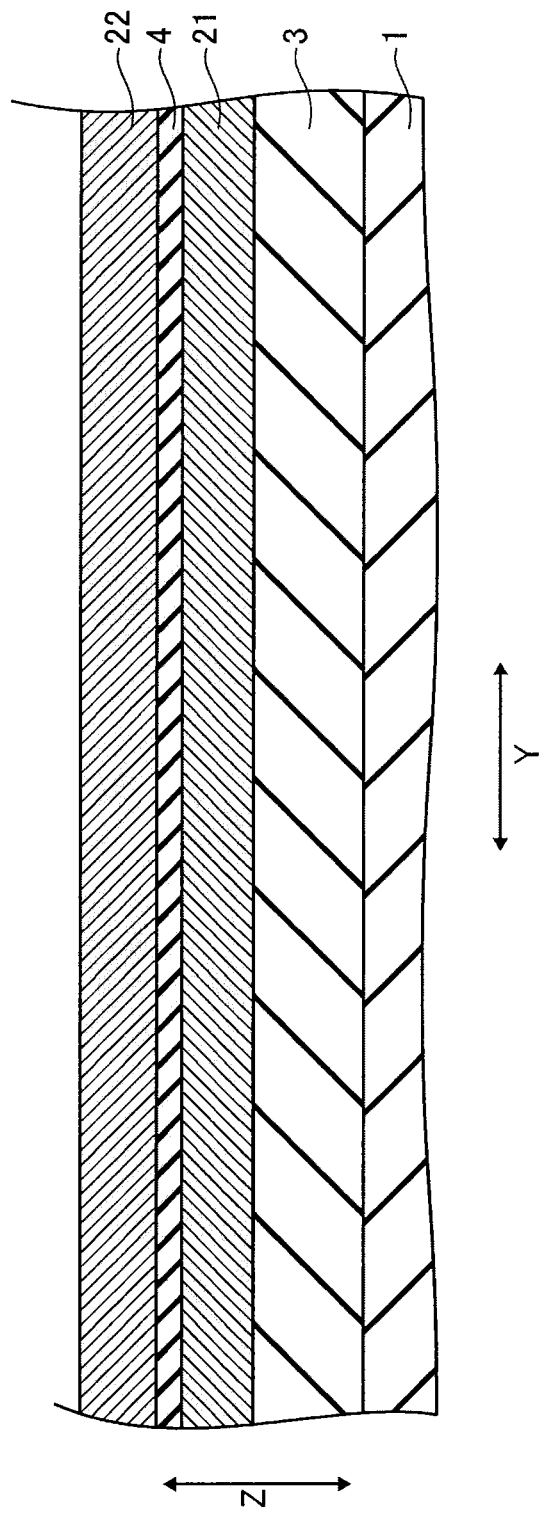
FIG. 4 is a cross-sectional view of the sensor along with a Y direction illustrating a manufacturing process of the sensor according to the embodiment of the present invention.

As shown in FIG. 4, the silicon dioxide film 3, the N-type polysilicon film 21, the silicon dioxide film 4 and the P-type polysilicon film 22 are stacked on the upper surface of the silicon substrate 1 in this order. In particular, wet oxidation treatment is applied on the upper surface of the silicon substrate 1 under the condition that the oxidation temperature is 1000° C. at first, and the silicon dioxide film 3 whose thickness is about 500 nm is formed. Then, the N-type polysilicon film 21 whose thickness is about 350 nm is formed on the upper surface of the silicon oxide film 3 by LPCVD (Low-Pressure Chemical Vapor Deposition) process with use of the $SiH_4$ gas under the condition that the film-forming temperature is 620° C. and the decree of vacuum is 66.6 Pa.

Thereafter, the silicon dioxide film 4 whose thickness is about 15 nm is formed on the upper surface of the N-type polysilicon film 21 by wet oxidation treatment under the condition that the oxidation temperature is 920° C. Then, the P-type polysilicon film 22 whose thickness is about 350 nm is formed on the upper surface of the silicon dioxide film 4 by LPCVD (Low-Pressure Chemical Vapor Deposition) process with use of $SiH_4$ gas under the condition that the film-forming temperature is 620° C., and the degree of vacuum is 66.6 Pa.

As a method of forming the N-type polysilicon film 21, a method in which the silicon dioxide film including P as an impurities is formed by the LPCVD process under the condition that flow rates of an $N_2$ gas, an $O_2$ gas, and a $PH_3$ gas are 34000 sccm, 300 sccm, and 3000 sccm for each, and the film-forming temperature is 950° C., can be considered. Thus, the impurities of the P are diffused in the obtained polysilicon film. Another method can be also considered such that P ion is implanted to the obtained polysilicon film under the condition that energy is 30 KeV and a dose amount is 1E16 $cm^{-2}$. As a method of forming P-type polysilicon film 22, a method in which B ion is implanted to the obtained polysilicon film under the condition that energy is 15 KeV and a dose amount is 1E16 $cm^{-2}$ can be considered.

Figure 5:
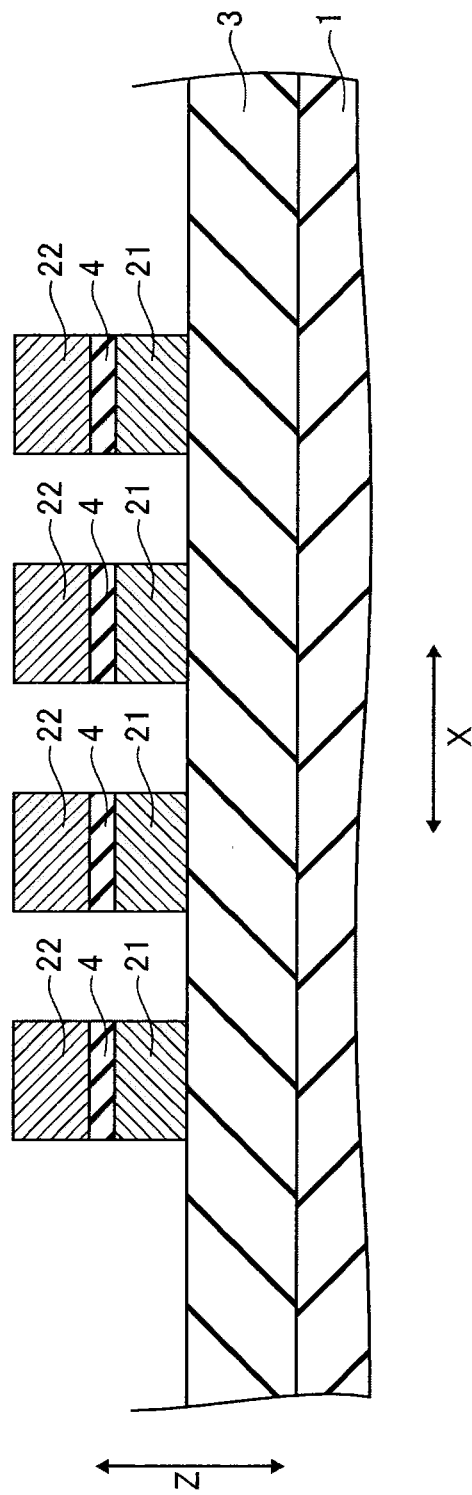
FIG. 5 is a cross-sectional view of the sensor along with an X direction illustrating the manufacturing process of the sensor according to the embodiment of the present invention.

As shown in FIG. 5, after the etching treatment is applied on the N-type polysilicon film 21, silicon dioxide film 4, and P-type polysilicon film 22 which are formed on the upper surface of the silicon dioxide film 3, a plurality of portions (four in FIG. 5) which configures the thermocouples 2 (refer to FIG. 1) are formed. In this case, a dry-etching treatment is appropriate for the N-type polysilicon film 21 and P-type polysilocon film 22 under the condition that the flow rates of the HBr gas, $Cl_2$ gas, and $O_2$ gas are 100 sccm, 30 sccm, and 1 sccm for each and the RF power is 20 W. Moreover, it is preferable to perform the dray-etching treatment to the silicon dioxide film 4 under the condition that the flow rates of the Ar gas, $CHF_3$ gas, and $CF_4$ gas are 300 sccm, 30 sccm, and 50 sccm for each and the RF power is 550 W.

Figure 6:
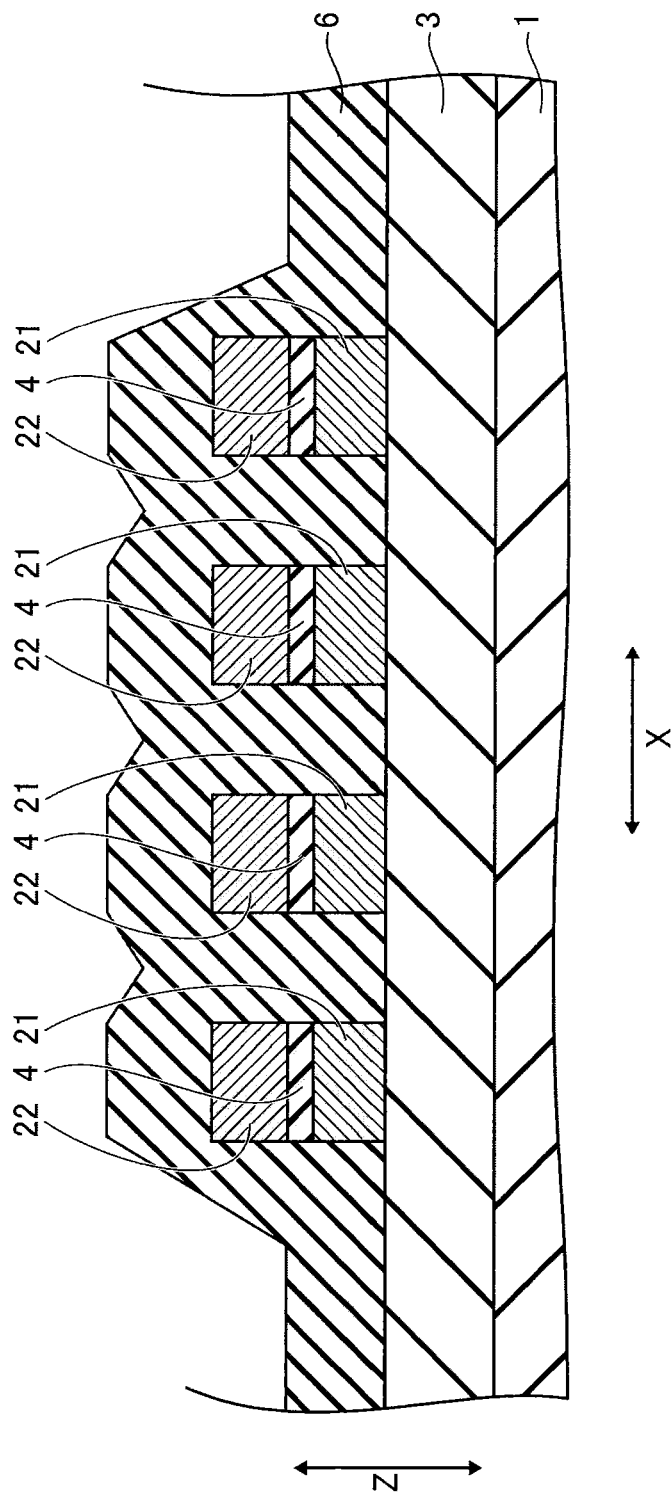
FIG. 6 is another cross-sectional view of the sensor along with the X direction illustrating the manufacturing process of the sensor according to the embodiment of the present invention.

As shown in FIG. 6, a silicon dioxide film 6 whose thickness is about 800 nm is formed so as to coat the entire surface of a structure shown in FIG. 5. The silicon dioxide film 6 configures the side, wall section 6a and the silicon dioxide film 6b. As a method of forming such a silicon dioxide film 6, an LPCVD process under the condition that the flow rates of the $SiH_4$ gas and $N_2O$ gas are 50 cc/min and 2300 cc/min for each, and the film-forming temperature is 800° C. can be considered. A plasma CVD process under the condition that the flow rates of the TEOS gas and $O_2$ gas are 520 cc/min and 500 cc/min for each and the RF power is 500 W can be also considered as the method.

Figure 7:
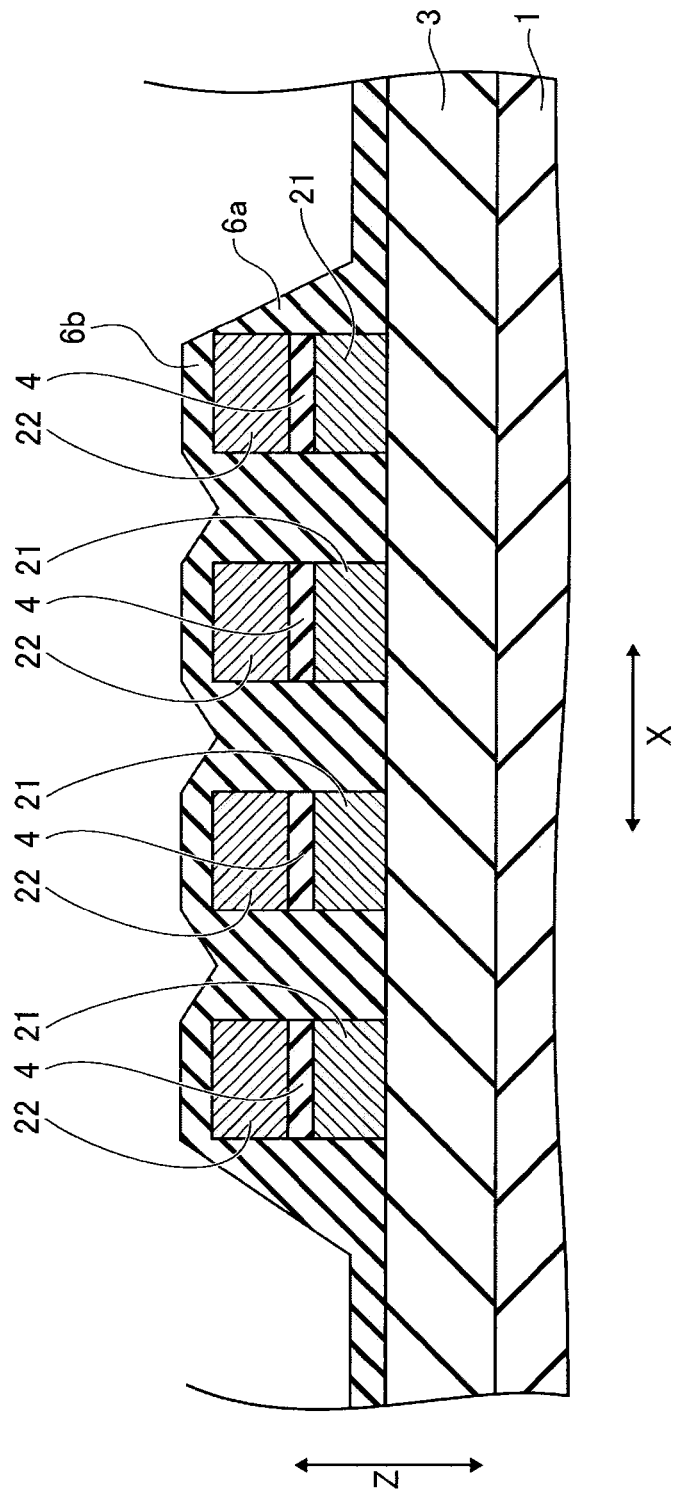
FIG. 7 is another cross-sectional view of the sensor along with the X direction illustrating the manufacturing process of the sensor according to the embodiment of the present invention.

As shown in FIG. 7, an etching treatment (etch back process) is applied to a configuration shown in FIG. 6, so that the thickness of about 800 nm of the silicon dioxide film 6 (refer to FIG. 6) is reduced to about 100 nm, thereby the side wall section 6a and the silicon dioxide film 6b are formed. As a method of reducing the thickness of the silicon dioxide film 6, the dry etching treatment under the condition that the flow rates of the Ar gas, $CHF_3$ gas and $CF_4$ gas are 300 sccm, 30 sccm, and 50 sccm for each, and the RF power is 550 W can be applied. Thereby, the silicon dioxide film 6b is formed on the upper surface of the portions which configure the thermocouple 2 (upper surface of P-type polysilicon film 22), and the side wall section 6a is formed around (side surfaces) the portions which configure the thermocouple 2. The silicon dioxide film 6 has a function to prevent the P-type polysilicon film 22 from being etched while the etch-back treatment in the later-described process is carried out. In such a process, the embedded metal 23 is formed (refer to FIGS. 12 and 13).

Figure 8:
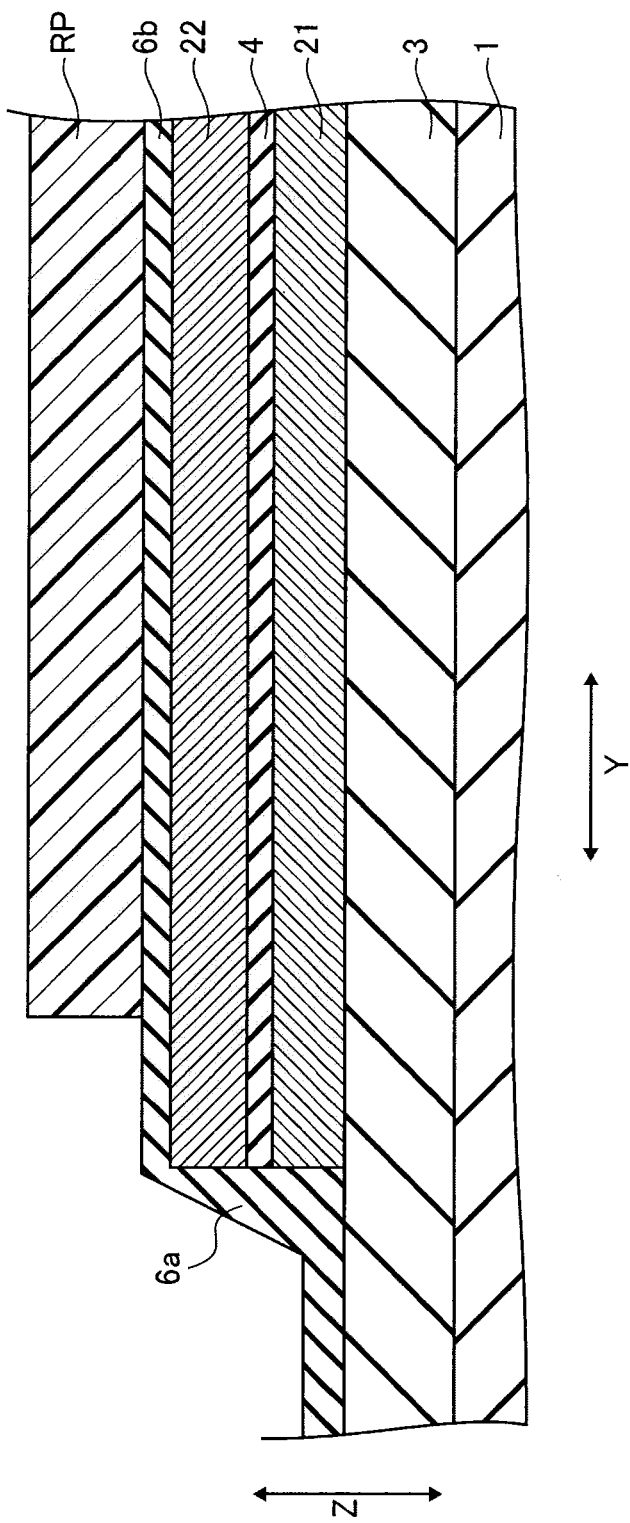
FIG. 8 is another cross-sectional view of the sensor along with the Y direction illustrating the manufacturing process of the sensor according to the embodiment of the present invention.
Figure 9:
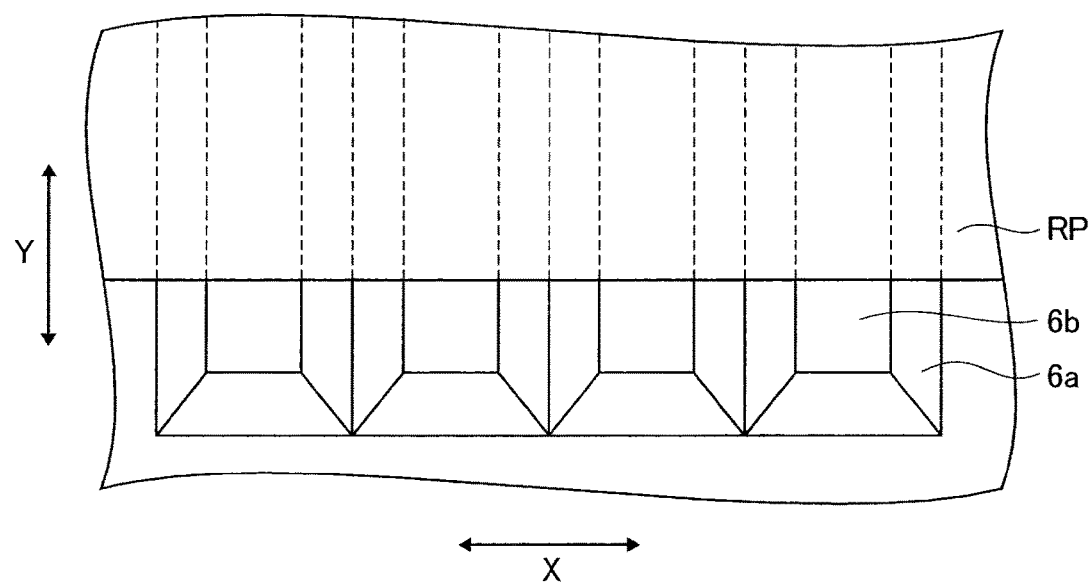
FIG. 9 is a plan view of the sensor shown in FIG. 8 which is viewed from an upper side.

As shown in FIGS. 8 and 9, a photoresist pattern RP is provided on the upper surface of a configuration shown in FIG. 7. The photoresist pattern RP is provided in order to form the later-described stepwise portion 5 (refer to FIGS. 10 and 11) by etching the silicon dioxide film 6b, P-type polysilicon film 22, and silicon dioxide film 3. The photoresist pattern RP is provided so as to cover the area other than the portion which corresponds to the stepwise portion 5 on the upper surface of the silicon dioxide film 6b. As described later, because the fitted metal 23 is formed to fill the self-aligned space formed by the side wall section 6a and the stepwise portion 5, the accurate position adjustment of the photoresist pattern RP is not necessary in the process shown in FIGS. 8 and 9.

Figure 10:
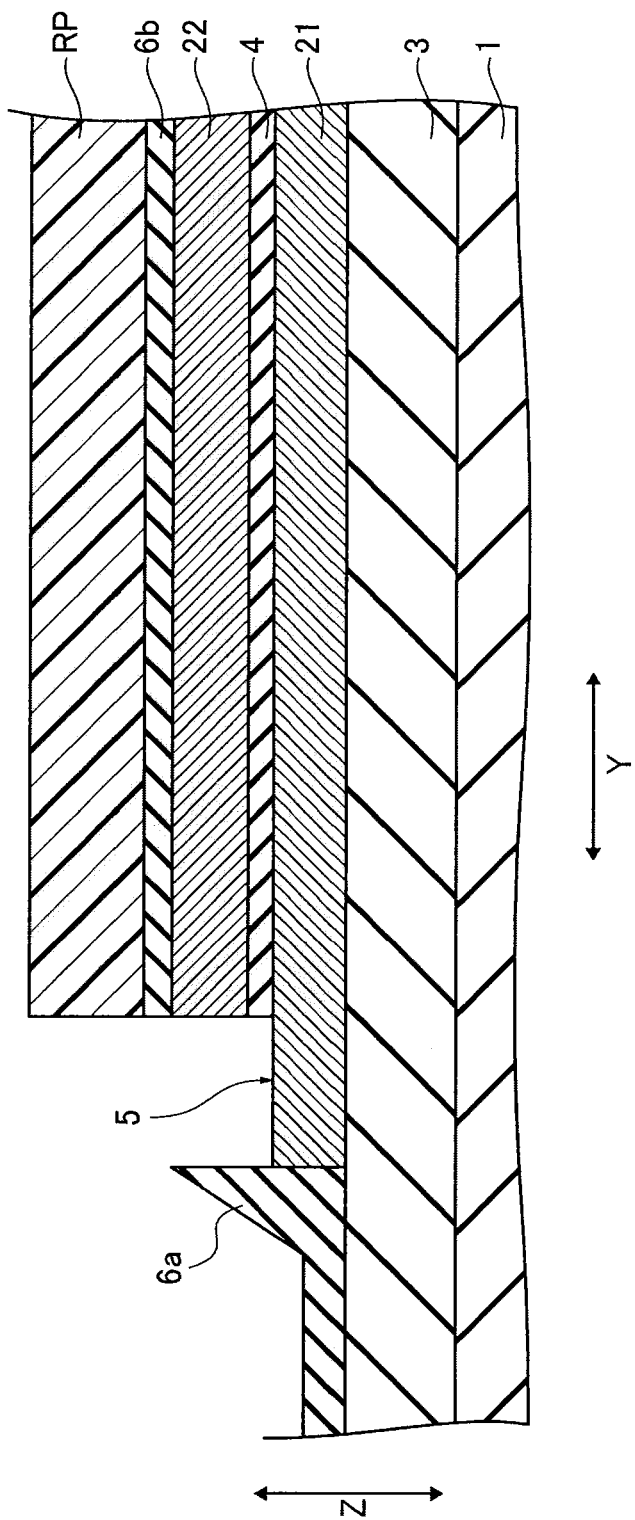
FIG. 10 is another cross-sectional view of the sensor along with the Y direction illustrating the manufacturing process of the sensor according to the embodiment of the present invention.
Figure 11:
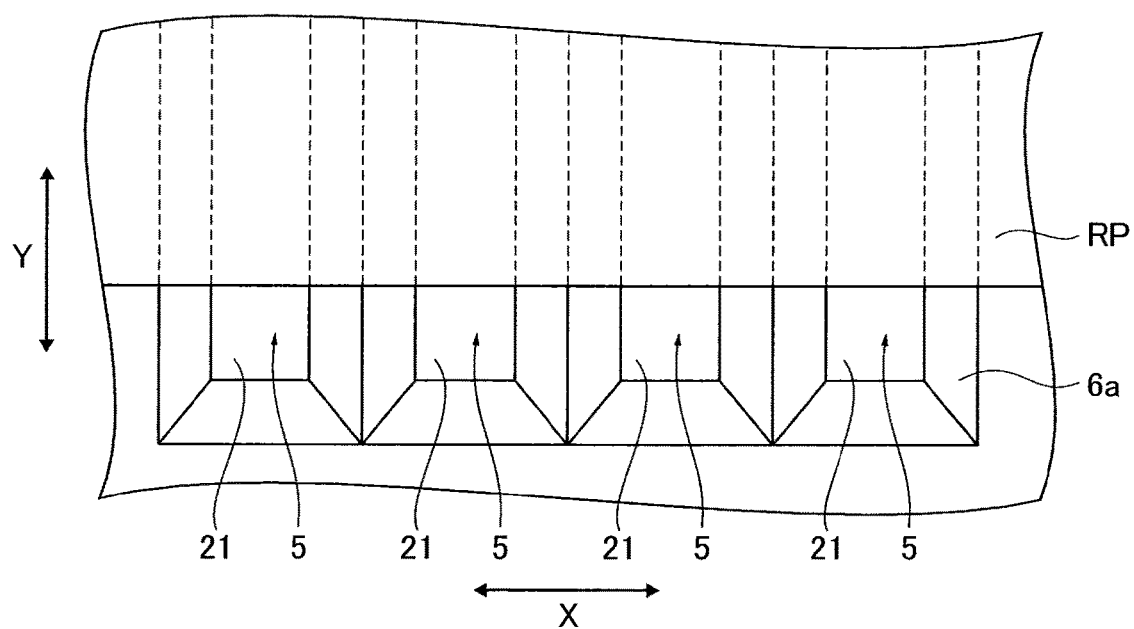
FIG. 11 is a plan view of the sensor shown in FIG. 10 which is viewed from the upper side.

As shown in FIGS. 10 and 11, by etching a configuration shown in FIGS. 8 and 9, so as to remove the end portion of the silicon dioxide film 6b, P-type polysilicon film 22 and silicon dioxide film 4 (left end portion in FIG. 10, lower end portion in FIG. 11), the stepwise portion 5 is formed. Thereby, the cuboid space for filling the fitted metal 23 is configured by the side wall section 6b and the stepwise portion 5 (the etched end-surfaces of the P-type polysilicon film 22 and silicon dioxide film 4, the upper surface of the portion where the N-type polysilicon film 21 protrudes from the P-type polysilicon film 22, and the internal surface of the side wall section 6a).

Figure 12:
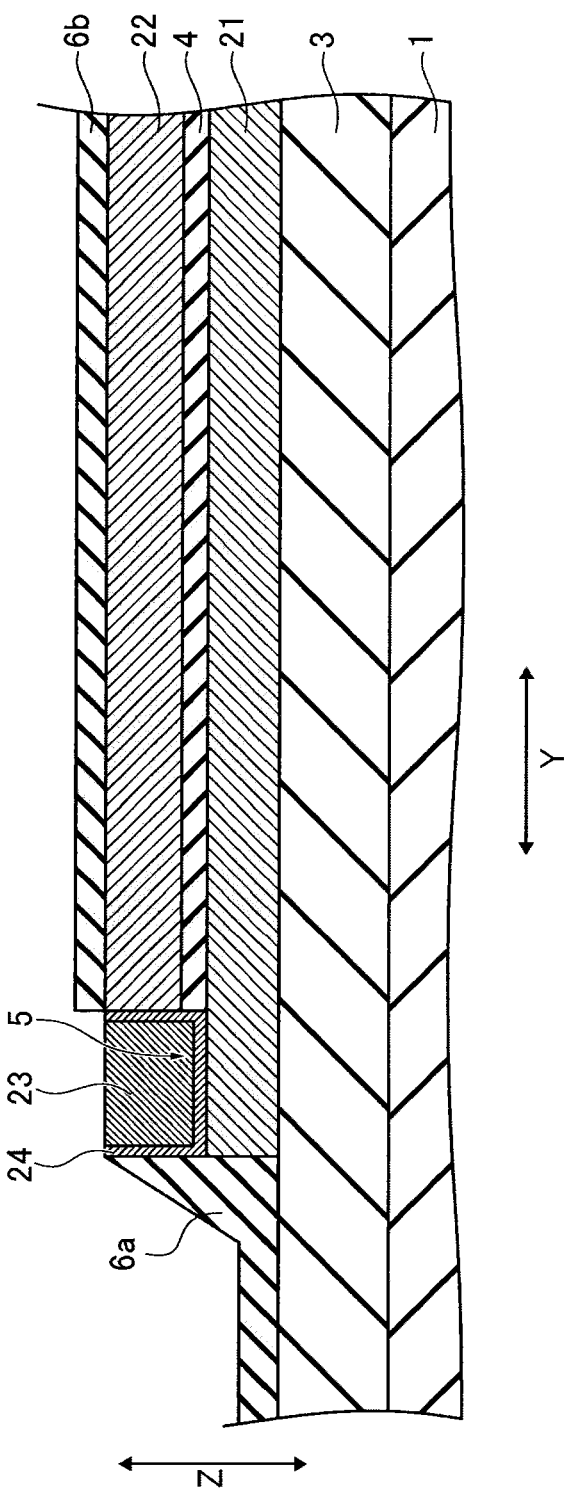
FIG. 12 is another cross-sectional view of the sensor along with the Y direction in order to illustrate the manufacturing process of the sensor, according to the embodiment of the present invention.
Figure 13:
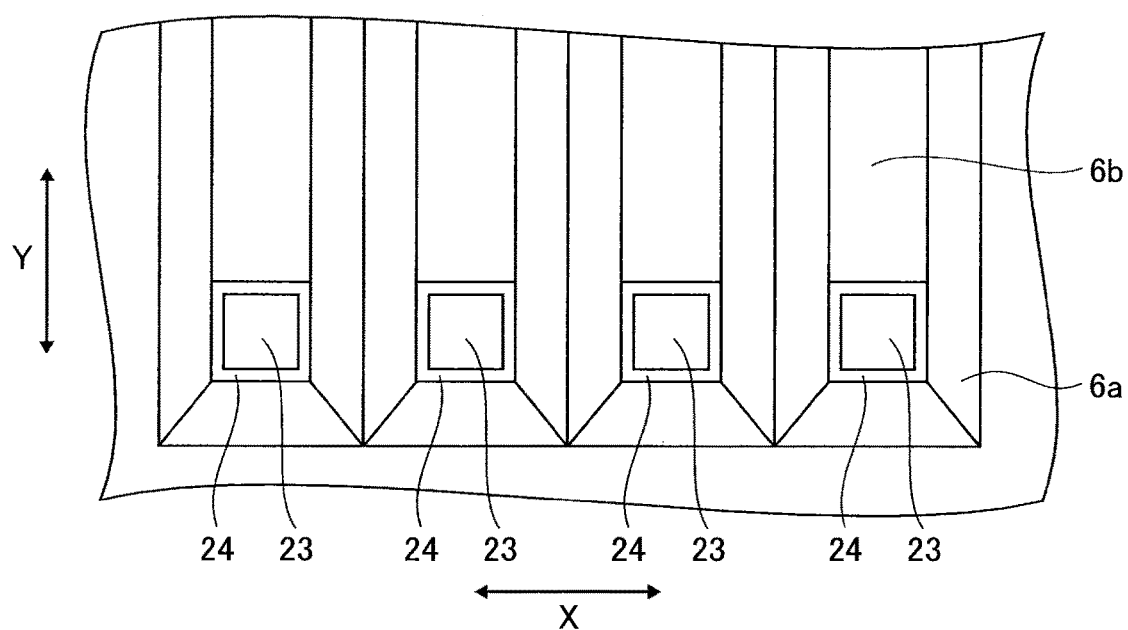
FIG. 13 is a plan view of the sensor shown in FIG. 12 which is viewed from the upper side.

Next, as shown in FIGS. 12 and 13, the photoresist pattern RP is removed from the upper surface of the configuration shown in FIGS. 10 and 11 and the fitted metal 23 is filled in the cuboid space which is formed by the side wall section 6b and the stepwise portion 5 through the adhesion layer 24. In particular, the adhesion layer 24 composed of titanium whose thickness is about 100 nm is formed by the sputtering method at first. At the moment, a heat treatment of 760° C. is applied for 30 seconds by the lamp annealing method. Then, tungsten is deposited with the thickness of about 800 nm inside the adhesion layer 24 by the heat CVD method under the condition that the flow rates of the $WF_6$ gas and Ar gas are 5 sccm and 150 sccm for each, and the film-forming temperature is 580° C. In addition, the etch-back treatment is applied on the about 800 nm-thickness tungsten by the dry-etching treatment under the condition that the flow rates of the $SF_6$ gas and Ar gas are 400 sccm and 200 sccm for each, and the RF power is 800 W. Thereby, the embedded metal 23 composed of tungsten is formed in the space inside the adhesion layer 24.

Other than the above-described methods, the following method can be considered for forming the embedded metal 23. For example, the N-type polysilicon is formed by the LPCVD method under the condition that the flow rates of $N_2$ gas, $SiH_4$ gas and $PH_3$ gas are 2000 sccm, 1800 sccm, and 150 sccm for each, and the film-forming temperature is 620° C. Then, the etch-back treatment is applied by the dry-etching treatment under the condition that the flow rates of HBr gas, $Cl_2$ gas, and $O_2$ gas are 100 sccm, 30 sccm, and 1 sccm for each, and the RF power is 20 W.

Thus, the sensor 100 according to the present embodiment is manufactured.

As described above, according to the present embodiment, the end portions of the P-type polysilicon film 22 on the hot junction area R2 is removed so that the stepwise portion 5 is formed in the end portion of the thermocouple 2 on the hot junction area R2. The embedded metal 23 is provided in the stepwise portion 5 in order that the N-type polysilicon film 21 and P-type polysilicon film 22 are electrically connected with each other. Thereby, different from the case in which the perpendicularly-stacked N-type polysilicon film 21 and P-type polysilicon film 22 are connected electrically through the connecting line, it is not necessary to form the corresponding end portions of the P-type polysilicon film 22 and N-type polysilicon film 21 thicker than the other portions, and it is not necessary to form the holes to dispose wiring lines in the thick portions. Consequently, in the case in which a plurality of thermocouples 2 is disposed on the upper surface of the silicon substrate 1, a plurality of thermocouples 2 can be disposed on the smaller space, so that the sensor 100 can be miniaturized. In addition, because each of the thermocouple 2 does not include the thick part, the distance between the thermocouples 2 can be shorter. Thus, the number of the thermocouples 2 which is disposed on the upper surface of the silicon substrate 1 can be increased, so that the sensor 100 can achieve high sensitivity. Accordingly, the sensor 100 can be configured to have high sensitivity as well as achieving miniaturization.

As described above, according to the present embodiment, in the pair of thermoelectric elements (N-type polysilicon film 21 and P-type polysilicon film 22), only the end portion of the P-type polysilicon film 22 on the hot junction area R2, which is disposed above the N-type polysilicon film 21 is removed. Then, the stepwise portion 5 is formed in the end portion of the thermocouples 2 on the hot junction area R2. Thus, compared with the case that the fitted metal is formed in the stepwise portion by removing the end portion of the N-type polysilicon film 21 disposed below the P-type polysilicon film 22, the embedded metal 23 can be formed more simple from the upper surface side of the silicon substrate 1.

As described above, according to the present embodiment, the side wall section 6a is formed around (side surface of) a plurality of thermocouples 2. The embedded metal 23 is filled in the space configured from the stepwise section 5 and the side wall section 6a (cuboid space configured from the end surfaces of the P-type polysilicon film 22 and silicon dioxide film 4 on the hot junction area R2, the upper surface of the portion where the N-type polysilicon film 21 protrudes from the P-type polysilicon film 22, and the internal surface of the side wall section 6a). Thereby, the embedded metal 23 for electrically connecting the N-type polysilicon film 21 and P-type polysilicon film 22 can be formed more simple by using the self-aligned cuboid space formed by the side wall section 6a and the stepwise section 5.

As described above, according to the present embodiment, a plurality of thermocouples 2 is disposed adjacent to each other. Thereby, the thermocouples can be disposed in high density, and it is effective for the sensor 100 to have the high sensitivity.

Figure 14:
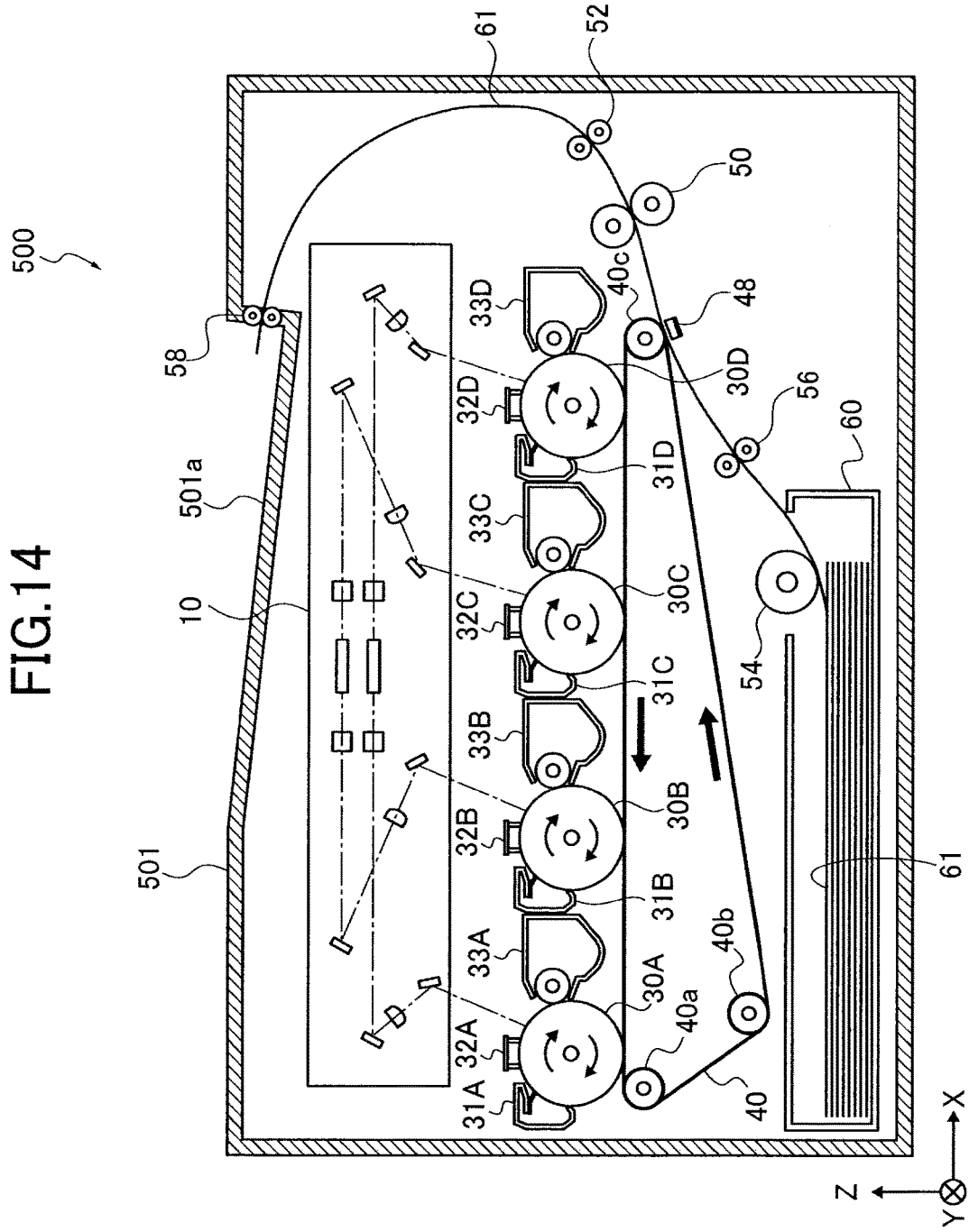
FIG. 14 is a schematic view of an image-forming apparatus according to the embodiment of the present invention.

Hereinafter, an image forming apparatus which includes the above-described sensor according to the present invention will be described with reference to FIG. 14. FIG. 14 provides an example of an image-forming apparatus 500.

The image-forming apparatus 500 is, for example, a tandem type color printer which prints multi-color images by superimposing and transferring black, yellow, magenta, and cyan color toner images onto sheets of paper. The image-forming apparatus 500 as shown in FIG. 14 comprises an optical scan apparatus 10, four photoconductive drums 30A to 30D, a transfer belt 40, a paper feed tray 60, a paper feed roller 54, a first resist roller 56, a second resist roller 52, a fuse roller 50, a paper discharge roller 58, a not-shown controller collectively controlling the respective components, and a housing 501 in a rectangular solid shape accommodating the components.

A paper discharge tray 501a on which printed sheets are discharged is formed on the top surface of the housing 501. The optical scan apparatus 10 is disposed under the paper discharge tray 501a.

The optical scan apparatus 10 scans the photoconductive drum 30A with a light beam for black image components modulated by image information supplied from a higher-level device (such as personal computer). Similarly, it scans the photoconductive drum 30B with a light beam for cyan image components, the photoconductive drum 30C with a light beam for magenta image components, and the photoconductive drum 30D with a light beam for yellow image components.

The four photoconductive drums 30A to 30D are cylindrical members and have photoconductive layers on their surfaces which become electrically conductive when illuminated with a light beam. They are disposed with an equal interval in an X-axis direction under the optical scan apparatus 10 in FIG. 14.

The photoconductive drum 30A is disposed at an end portion of a reverse X-axis direction (left side in FIG. 14) inside the housing 501 so that its longitudinal direction is to be the Y-axis direction. The photoconductive drum 30A is rotated by a not-shown rotation mechanism clockwise (as indicated by black arrows in FIG. 14). An electric charger 32A at the 12 o'clock position (upper side), a toner cartridge 33A at 2 o'clock position and a cleaning case 31A at the 10 o'clock position are disposed around the photoconductive drum 30A.

The electric charger 32A is disposed with a predetermined clearance over the surface of the photoconductive drum 30A with its longitudinal direction as the Y-axis direction. It electrically charges the surface of the photoconductive drum 30A with a predetermined voltage.

The toner cartridge 33A includes a cartridge body containing a toner of black image components and a developing roller charged with a voltage of reverse polarity of that of the photoconductive drum 30A, and the like. The toner cartridge 33A supplies the toner in the cartridge body to the surface of the photoconductive drum 30A via the developing roller.

The cleaning case 31A is provided with a cleaning blade of a rectangular shape with its longitudinal direction as the Y-axis direction, and it is disposed so that one end of the cleaning blade comes in contact with the surface of the photoconductive drum 30A. The toner adhering on the surface of the photoconductive drum 30A is removed by the cleaning blade along with the rotation of the photoconductive drum 30A and collected in the cleaning case 31A.

The photoconductive drums 30B, 30C, 30D with the same structure as that of the photoconductive drum 30A are placed in sequence on the right side of the photoconductive drum 30A with a predetermined interval. They are rotated by a not-shown rotation mechanism clockwise (as indicated by the black arrows in FIG. 14). Similarly to the photoconductive drum 30A, electric chargers 32B, 32C, 32D, toner cartridges 33B, 33C, 33D, and cleaning cases 31B, 31C, 31D are disposed around the photoconductive drums 30B, 30C, 30D, respectively.

The electric chargers 32B, 32C, 32D with the same structure as that of the electric charger 32A are disposed to electrically charge the surfaces of the photoconductive drums 30B, 30C, 30D with a predetermined voltage, respectively.

The toner cartridges 33B, 33C, 33D include cartridge bodies containing toners of cyan, magenta, yellow image components and developing rollers charged with a voltage of reverse polarity of that of the photoconductive drums 30B, 30C, 30D, and the like, respectively. The toner cartridges 33B, 33C, 33D supply the toners in the cartridge bodies to the surfaces of the photoconductive drums 30B, 30C, 30D via the developing rollers, respectively.

The structure and function of the cleaning cases 31B, 31C, 31D are the same as those of the cleaning case 31A.

Hereinafter, a unit of the photoconductive drum 30A, the electric charger 32A, the toner cartridge 33A, and the cleaning case 31A is to be referred to as the first image-forming station; likewise, a unit of the photoconductive drum 30B, the electric charger 32B, the toner cartridge 33B, and the cleaning case 31B as the second image-forming station, a unit of the photoconductive drum 30C, the electric charger 32C, the toner cartridge 33C, and the cleaning case 31C as the third image-forming station, and a unit of the photoconductive drum 30D, the electric charger 32D, the toner cartridge 33D, and the cleaning case 31D as the fourth image-forming station.

The transfer belt 40 is a free end ring-like member and rolls over driven rollers 40a, 40c placed under the photoconductive drums 30A, 30D, respectively, and rolls over a drive roller 40b which is placed at a slightly lower position than the driven rollers 40a, 40c. The upper end surface of the transfer belt 40 is in contact with the lower end surfaces of the photoconductive drums 30A, 30B, 30C, 30D. The transfer belt 40 is rotated counterclockwise (as indicated by the black arrows in FIG. 14) by counterclockwise rotation of the drive roller 40b. A transfer charger (transfer unit) 48 is applied with a voltage of a reverse polarity of that of the electric chargers 32A, 32B, 32C, 32D and is placed close to one end of the transfer belt 40 in the X-axis direction (right side in FIG. 14).

The paper feed tray 60 of a substantially rectangular solid shape is placed under the transfer belt 40 and contains stacked-up paper sheets 61 for printing. The paper feed tray 60 has a feeder outlet of a rectangular shape close to one end of the upper surface thereof in the X-axis direction (right side in FIG. 14).

The paper feed roller 54 extracts paper sheets 61 one by one from the paper feed tray 60 to feed them to a gap formed between the transfer belt 40 and the transfer charger 48 via the first resist roller 56 composed of a pair of rotary rollers.

The fuse roller 50 is composed of a pair of rotary rollers, and applies heat and pressure to the paper sheets 61 to feed the paper sheets 61 to the discharge roller 58 via the resist roller 52 composed of a pair of rotary rollers. The discharge roller 58 is composed of a pair of rotary rollers and discharges the paper sheets 61 to the discharge tray 501a.

Then, the image-forming apparatus 500 according to the present embodiment is provided with the sensor 100; as a result, a high quality image may be formed without leading to a high cost and a large size.

Consequently, the sensor according to the embodiment of the present invention, it is not necessary to form the corresponding end portions of the pair of thermoelectric elements thicker than the other portions, compared with the case that the pair of thermoelectric elements are perpendicularly stacked and electrically connected with each other through the connecting line. Thereby, when a plurality of thermocouples is disposed on the upper surface of the substrate, a plurality of thermocouples can be disposed in the smaller area so that the miniaturization of the elements can be achieved. In addition, because each of the thermocouples does not include the thick portion, the distance between the thermocouples can be reduced. Thus, the number of the thermocouples to be disposed on the upper surface of the substrate can be increased, so that the sensor can achieve high sensitivity. As a result, the miniaturization and the high sensitivity in the element are improved.

Although the embodiment of the present invention has been described above, the present invention is not limited thereto. It should be appreciated that variations may be made in the embodiment described by persons skilled in the art without departing from the scope of the present invention.

What is claimed is:

1. A sensor, comprising:
    a substrate including a cold junction area and a hot junction area;
    a thermocouple including a pair of thermoelectric elements which extend linearly between the cold junction area and the hot junction area, and stacked on an upper surface of the substrate;
    a stepwise portion disposed in the hot junction area and in an end portion of the thermocouple, the stepwise portion having been formed by removing a portion adjacent to an end portion of one of the pair of thermoelectric elements; and
    a wiring part of metal disposed in the stepwise portion so as to connect electrically the pair of thermoelectric elements to each other.

2. The sensor according to claim 1, wherein
    the stepwise portion is formed adjacent to the end portion of the thermocouple by removing the portion adjacent to the end portion of the upper side thermoelectric element of the pair of thermoelectric elements stacked on an upper surface of the substrate.

3. The sensor according to claim 2, further comprising:
    a side wall section which covers at least a side surface adjacent to the end portion of the thermocouple,
    wherein the wiring part is filled in an area configured from the stepwise portion and the side wall section.

4. The sensor according to claim 1, wherein
    the thermocouple including the stepwise portion comprises a plurality of thermocouples, and
    the plurality of thermocouples are disposed adjacent to each other.

5. The sensor according to claim 1, wherein
    the pair of thermoelectric elements include a P-type polysilicon film and an N-type polysilicon film.

6. An image-forming apparatus comprising the sensor according to claim 1.

7. A method of manufacturing a sensor, comprising the steps of:
    forming a thermocouple which extends linearly between a cold junction area and a hot junction area by stacking a pair of thermoelectric elements on an upper surface of a substrate including the cold junction area and the hot junction area;
    forming a stepwise portion in the hot junction area and adjacent to an end portion of the thermocouple by removing the portion adjacent to the end portion of one of the thermoelectric elements; and
    forming in the stepwise portion a wiring part of metal for connecting electrically the pair of thermoelectric elements to each other.

* * * * *